United States Patent
Lotz et al.

(10) Patent No.: US 7,106,516 B2
(45) Date of Patent: Sep. 12, 2006

(54) MATERIAL WITH SPECTRALLY SELECTIVE REFLECTION

(75) Inventors: Hans-Georg Lotz, Grundau (DE); Peter Sauer, Schluchtern (DE)

(73) Assignee: Applied Films GmbH & Co. KG, Alzenau (DE)

( * ) Notice: Subject to any disclaimer, the term of this patent is extended or adjusted under 35 U.S.C. 154(b) by 0 days.

(21) Appl. No.: 10/353,802

(22) Filed: Jan. 29, 2003

(65) Prior Publication Data

US 2003/0156326 A1   Aug. 21, 2003

(30) Foreign Application Priority Data

Feb. 4, 2002   (DE) ................. 102 04 556

(51) Int. Cl.
*G02B 1/10*   (2006.01)
(52) U.S. Cl. .............. 359/584; 359/585; 359/589; 359/359; 359/360
(58) Field of Classification Search ........ 359/584–585, 359/588–589, 577, 359–360
See application file for complete search history.

(56) References Cited

U.S. PATENT DOCUMENTS

| 4,979,803 | A | | 12/1990 | McGuckin et al. |
| 5,486,884 | A | | 1/1996 | De Vaan |
| 5,646,781 | A | * | 7/1997 | Johnson, Jr. ............... 359/389 |
| 5,726,805 | A | | 3/1998 | Kaushik et al. |
| 5,731,898 | A | | 3/1998 | Orzi et al. |
| 5,978,133 | A | * | 11/1999 | Gillich ....................... 359/359 |
| 5,999,321 | A | | 12/1999 | Bradley |
| 6,031,653 | A | | 2/2000 | Wang |
| 6,034,813 | A | | 3/2000 | Woodard et al. |
| 6,768,763 | B1 | | 7/2004 | Du et al. |

FOREIGN PATENT DOCUMENTS

| DE | 39 27 087 C2 | 3/1990 |
| DE | 196 40 404 A1 | 4/1998 |
| DE | 197 47 597 A1 | 8/1998 |
| DE | 197 45 881 A1 | 5/1999 |
| DE | 199 01 970 A1 | 8/2000 |
| EP | 0 442 738 A2 | 8/1991 |
| WO | WO-95/17690 | 6/1995 |
| WO | WO-01/05000 A1 | 1/2001 |

* cited by examiner

Primary Examiner—Leonidas Boutsikaris
(74) Attorney, Agent, or Firm—Fulbright & Jaworski L.L.P.

(57) ABSTRACT

A material with spectrally selective reflection in the primary valences of red, green and blue is applied preferably onto laser projection screens in order to make possible the projection even in daylight. In a first embodiment, a first layer of a material that is highly reflective over the entire range of visible light, e.g., aluminum is applied onto a substrate, e.g., glass or a synthetic material, followed by a second layer of a material that is essentially non-absorbing over the entire range of visible light, e.g., $SiO_2$. A third layer in contact with air is applied to the second layer and is made of a material that is partially transmissive over the entire range of visible light, e.g., of NiCr An alternative embodiment comprise five layers, The first layer is made a material with a high index of refraction, e.g.; $TiO_2$, a second of a material with a low index of refraction, e.g., $SiO_2$, the third of a material with a high index of refraction, e.g., $TiO_2$: a fourth of a material with a low index of refraction. e.g., $SiO_2$, and a fifth layer of a material with a high index of refraction, e.g., $TiO_2$.

24 Claims, 1 Drawing Sheet

MATERIAL WITH SPECTRALLY SELECTIVE REFLECTION

FIELD OF THE INVENTION

The invention relates to a material with spectrally selective reflection, preferably in the valences of red, green and blue.

BACKGROUND AND SUMMARY OF THE INVENTION

Materials with specific optical properties are needed in numerous technical fields. For example specific layers are applied onto synthetic materials in order to generate mirror properties (DE 39 27 087 C2), or multilayer systems are applied onto window panes in order to provide thermal protection (DE 197 45 881 A1).

Multilayer filter systems, which have specific reflection and/or transmission properties (WO 95/17690), are also employed in the case of liquid crystal displays. These filter systems comprise for example in each pixel region filters for red, green and blue, with each filter having a common dielectric broadband mirror. The difference between the filters consists in the tuning thickness between the mirrors for each filter. Use of the common dielectric broadband mirror simplifies the process of production of mosaic arrays in the RGB filter.

Furthermore a color filter grouping for a surface image sensor is known, which comprises several color filters on the sensor, which selectively filter out different colors (U.S. Pat. No. 4,979,803). Each color filter comprises at the bottom a semitransparent and partially reflecting silver layer. On this silver layer is disposed a transparent and absorption-free dielectric layer having a thickness which is selected such that it corresponds to the wavelengths of the light to impinge onto the image sensor.

A further known optical filter is comprised of two mirror layers which form an optical resonance space with a dielectric layer being disposed between these mirror layers (U.S. Pat. No. 5,726,805).

Another filter with variable wavelengths of modifying etalon type comprises at least two reflecting surfaces whose spacing from each other is not constant but rather increases or decreases monotonically from the spacing in a selected direction in a light-sensitive plane of the etalon (EP 0 442 738 A2).

Interference filter groupings on the basis of a thin metal filter and comprising at least one dielectric layer between two metal layers are disclosed in U.S. Pat. No. 6,031,653. The two metal layers are of a thickness which is less than the penetration depth of the radiation.

Furthermore is known an optical filter in which several optical layers are disposed one on the other, which are alternately comprised of a high-refraction material, $TiO_2$, and a low-refraction material, $SiO_2$ (U.S. Pat. No. 5,731,898).

None of the filters listed above reflects spectrally selectively in the primary valences of red, green and blue, as a consequence of which the filters are not suitable for a laser projection screen.

Projection screens must have special optical properties in order to ensure brilliant image representation. This applies especially to laser projection, in which a deflectable laser beam, into which the primary colors red, green and blue are coupled, scans the screen (cf DE 196 40 404 A1). The projection screens must have reflection maxima in the red, green, blue wavelengths of approximately 629 nm, 532 nm and 447 nm, respectively. In addition, a broadband background light must be absorbed, for example in a subjacent black layer.

A further requirement made of the properties of laser projection screens comprises that the reflection must not involve a mirror-like reflection but rather a diffuse reflection in a preselectable solid angle range in order for the viewing of the projected images to be possible from different locations. Reflections in a spatial region in which no observer is present must be avoided in order to minimize intensity losses. The screen must thus not be a Lambert radiator in which the luminance is constant in all directions of a half space. According to DIN standard 19045, Bereich Betrachtungsbedingungen {Area: Viewing Conditions}, the reflection should be up to ±40° in the horizontal direction, measured from the projection axis, and ±10° in the vertical direction, measured from the visual axis of a central viewer. In addition, the shift which can be observed of the reflection characteristic with changed reflection angle—the so-called color flop—should also be largely suppressed.

Lastly, projection screens should meet the requirement that they also ensure good recognizability of the projected images in non-darkened rooms.

The invention therefore addresses the problem of providing a material for projecting screens which is suitable for laser projection. This problem is solved according to the present invention.

The invention consequently relates to a material with spectrally selective reflection in the primary valences of red, green and blue. This material is preferably applied onto laser projection screens in order to make projection possible even in daylight. In a first solution, onto a substrate, for example glass or synthetic material, a first layer of aluminum is applied, which is followed by a second layer of $SiO_2$, on which, in turn, a layer of NiCr is disposed. The latter is in contact with air. A second solution comprises five layers, of which the first is comprised of $TiO_2$, the second of $SiO_2$, the third of $TiO_2$ the fourth of $SiO_2$ and the fifth of $TiO_2$. The first layer is here connected with the substrate, while the fifth layer is in contact with air. The first solution is much simpler than the second solution.

In an embodiment of the invention, a material is provided having spectrally selective reflection in the ordinary valences of red, green and blue, having a first layer highly reflecting over the entire range of visible light: a second layer, essentially non-absorbing over the entire range of visible light, which is disposed on the first layer and whose optical thickness is between approximately 600 nm and 900 nm, with the optical thickness being defined as 4 .n .d where n is the index of refraction and d the geometric thickness: a third leyer, partially transmissive over the entire range of visible light, which is disposed on the second layer, with the third layer having a geometric thickness of approximately 20 to 80 rim.

In an alternative embodiment, the material has a first layer of a material with a high index of refraction which is approximately 400 to 600 nm thick; a second layer of a material with a low index of refraction which is approximately 127 nm thick and which is disposed on said first layer: a third layer of a material with a high index of refraction which is approximately 400 to 600 um thick and which is disposed on said second layer: a fourth layer of a material with a low index of refraction which is approximately 72 nm thick and which is disposed on said third layer: a fifth layer of a material with a high index of refraction which is approximately 400 to 600 nm thick and which is disposed on the fourth leyer. The material with a high index of refraction in at least one of said first layer, the third layer and the fifth layer is selected from $TiO_2$, $Ta_2O_5$, $TiO_xN_y$, and the material with a low index of refraction in said second and fourth layers are each $SiO_2$, The advantage attained with the invention comprises in particular that utilizing only three layers, one metallic layer and two dielectric layers, the above stated requirements are met in a laser image screen. It is here especially advantageous that the metallic layer can be produced cost-effectively, for example by vapor deposition in film coating installations. In comparison to sputter processes the metal layer can be applied at approximately the 10- to 100-fold rate. The dielectric layer can alternatively be applied with the cost-effective vapor deposition technology or the sputter technology. The requirements are alternatively also fulfilled with the aid of a five-layer system of dielectric materials with a high index of refraction. However, the production of the five-layer system is significantly more costly than the production of the three-layer system. Both layer systems can be readily produced as a large-area system by means of a DC or a medium frequency sputter process. Consequently the expensive production of the fully dielectric layer systems commonly used up to now becomes superfluous. The reproducibility of the layer thickness and the indices of refraction is better than 1%.

It is understood that projection operation under daylight conditions entails a certain desaturation of the colors. Daylight contains a component in the RGB range. If the laser is switched off and only daylight falls onto the coated screen, the screen appears white since the reflected daylight component in the RGB range yields the color white through an additive color mixture. This white is superimposed onto the laser colors such that the color saturation decreases slightly in comparison to pure spectral colors. The decrease of the color saturation, however, is less than is the case with conventional white screens, since a large component of the daylight spectrum, which is outside of the RGB maxima, is absorbed.

Embodiment examples of the invention are depicted in the drawings and will be described in further detail below.

DETAILED DESCRIPTION

Figure 1:
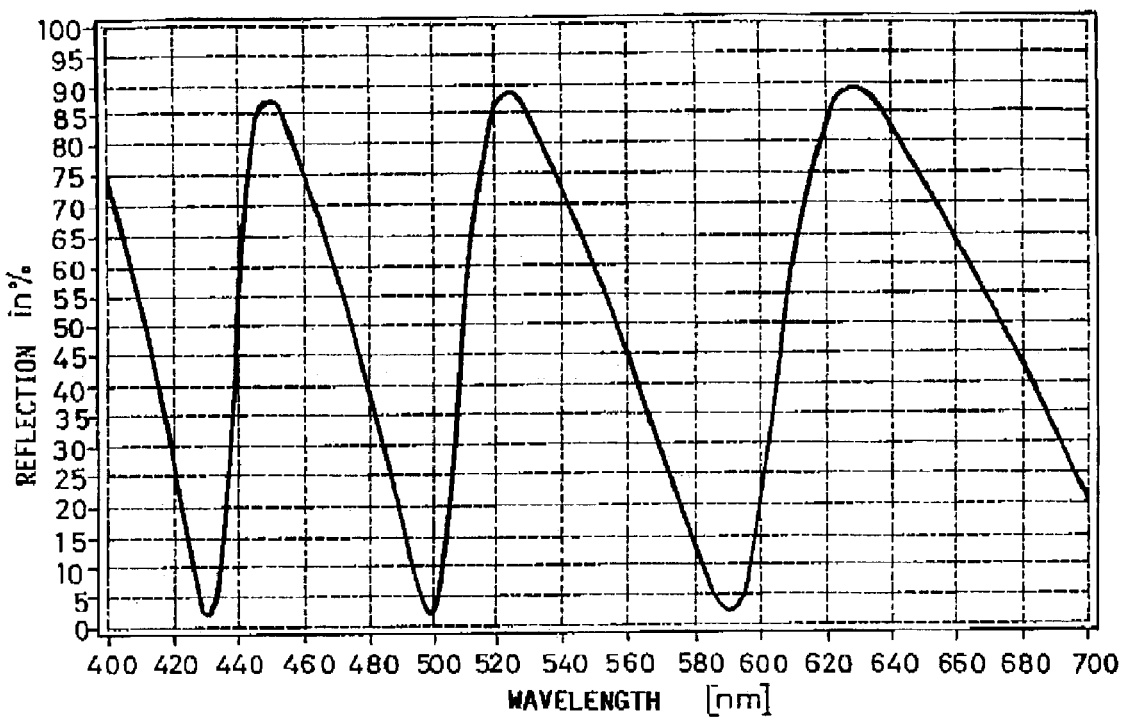
FIG. 1 the reflection curve of a material comprised of three layers.

FIG. 1 depicts the reflection curve of a material comprised of three layers disposed one above the other, which is applied onto a substrate, for example onto glass or a synthetic material film. The first layer of this material, disposed directly on the substrate, is an aluminum layer having a thickness of approximately 100 nm, the second layer, disposed on the aluminum, is an $SiO_2$ layer approximately 1030 nm thick, and the third layer, which is applied onto the $SiO_2$ and which is in contact with air, is an NiCr layer approximately 30 nm thick. The first layer consequently is a layer highly reflecting over the entire range of visible light, while the second layer, which is disposed on the first layer, is a layer essentially non-absorbing over the entire range of visible light. Lastly the third layer is a layer, disposed on the second layer, which is partially transmissive over the entire range of visible light. This third layer is disposed above the other layers; the light to be reflected impinges directly onto this third layer.

As is evident in FIG. 1, the three-layer material has reflection maxima at approximately 445 nm, at 525 nm and at 629 nm. These wavelengths correspond rather precisely to the primary wavelengths for blue, green and red. In the case of the solution according to FIG. 1 the property of metallic layers is utilized, with which, in combination with a dielectric layer, reflection spectra can be generated which selectively reflect at different wavelengths.

The position of the curve in the spectrum can be varied readily by varying the layer thickness of the dielectric central layer. The central layer acts like a spacer in a Fabry-Perot filter, with the layer thickness being selected such that the higher orders generate the additional peaks. This means that for example the principal reflection is in the infrared range, i.e. at the fundamental frequency, but the reflection of the primary valences is in the secondary reflections, the so-called higher orders. A vacuum spacer without absorption could also be employed. The colors red, green and blue are reflected if as the higher order of the spacer layer is selected that at which the reflection peaks or maxima are at the wavelengths of the colors red, green and blue.

The first layer on the substrate ideally has as high a reflection as is possible in the visible range. Suitable materials are aluminum and silver. If, for example, NiCr were to be selected as the first layer, the height of the reflection peak would decrease drastically to 30 to 40%. The partial transmissivity of the third layer, which is provided above, lies at approximately 50% transmission and approximately 25% reflection. If the thickness of the NiCr layer is decreased from 30 nm to 20 nm, the reflection is increased at the maxima but also at the minima. If the thickness of the NiCr layer is increased from 30 nm to 50 nm, the reflection at the maxima is strongly decreased but less so at the minima.

There also is an optimum of the layer thickness in the upper layer, at which simultaneously high reflection at the maxima and as low as possible a reflection at the minima is attained.

The optimum layer thickness is a function of the material. With different metals different layer thicknesses result in the upper layer.

Figure 2:
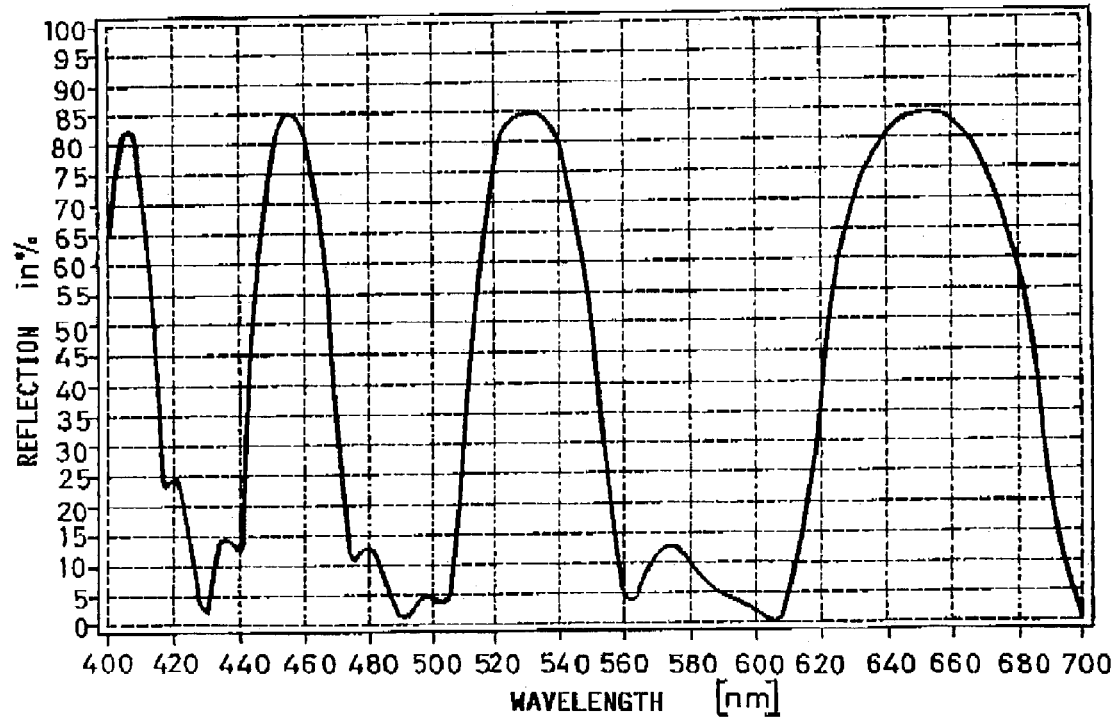
FIG. 2 the reflection curve of a material comprised of five layers.

FIG. 2 depicts a further reflection curve, which has its maxima at the desired RGB locus of the spectrum. This reflection curve relates the optical properties of a material which is comprised of five layers. The first layer directly connected with the substrate—for example glass or synthetic material—is comprised of an approximately 468 nm thick $TiO_2$ layer. On this $TiO_2$ layer is disposed an approximately 127 nm thick $SiO_2$ layer, on which, in turn, a 468 nm thick $TiO_2$ layer is disposed. The last cited $TiO_2$ layer is followed by a 72 nm thick $SiO_2$ layer on which, in turn, a 483 nm thick $TiO_2$ layer is disposed. This last $TiO_2$ layer is in contact with air.

$TiO_2$ has a high index of refraction of approximately 2.35; $Bi_2O_3$, $Ta_2O_5$ or $TiO_xN_y$, or diamond C or silver bromide or silver iodide or cadmium sulfide have similarly high indices of refraction. $SiO_2$ has a low index of refraction of approximately 1.45. Similarly low are the indices of refraction of fluorspar or opal. The refractive index is a function of the wavelength and is often measured at 589 nm, which corresponds to the wavelength of yellow sodium light. Titanium dioxide is present in the modifications anatase (index of refraction 2.49–2.56) and rutile (index of refraction 2.61–2.90).

Application of these layers onto the substrate is accomplished by means of a sputter process carried out for example with a 6-cathode sputter installation. Preferred is the high-rate medium frequency magnetron sputter process.

With such an installation, synthetic material films up to a thickness of 100 μm can be coated.

The adhesion of the layers on one another and that of the lowest layer on the substrate is very good such that no special adhesion layers are required.

As the substrate material, preferably rigid synthetic material substrates and firm composite materials are employed. Glass is a preferred substrate.

It is claimed:

1. A material with spectrally selective reflection in the primary valences of red, green and blue, comprising:
    a substrate;
    a first layer on said substrate, said first layer first layer highly reflecting over the entire range of visible light;
    a second layer, essentially non-absorbing over the entire range of visible light, which is disposed on said first layer and whose optical thickness is selected such tat the main reflection lies in the infrared and that side reflections lie at red, green and blue;
    a third layer, partially transmissive over the entire range of visible light which is disposed on the second layer, wherein the third layer has a geometric thickness of approximately 20 to 80 nm.

2. The material as claimed in claim 1, wherein said first layer comprises aluminum, said second layer comprises $SiO_2$ and said third layer comprises NiCr.

3. The material as claimed in claim 1, wherein said first layer is disposed on a substrate.

4. The material as claimed in claim 1, wherein said third layer is in contact with air.

5. The material as claimed in claim 2, wherein said first layer has a thickness at approximately 100 nm.

6. The material as claimed in claim 2, wherein said second layer has a geometric thickness of approximately 1030 nm.

7. The material as claimed in claim 2, wherein said third layer has a geometric thickness approximately 30 nm thick.

8. A material with spectrally selective reflection in the primary valences red, green and blue, comprising:
    a first layer of a material with a high index of refraction which is approximately 400 to 600 nm thick;
    a second layer of a material with a low index of refraction which is approximately 127 nm thick and which is disposed on said first layer;
    a third layer of a material wit a high index of refraction which is approximately 400 to 600 nm thick and which is disposed on said second layer;
    a fourth layer of a material with a low index of refraction which is approximately 72 nm thick and which is disposed on said third layer;
    a fifth layer of a material with a high index of refraction which is approximately 400 to 600 nm thick and which is disposed on said fourth layer;
    wherein said material with a high index of refraction in at least one of said first layer, said third layer and said fifth layer is selected from the group consisting of $TiO_2$, $Ta_2O_5$, $TiO_xN_y$ and $Bi_2O_3$ and said material with a low index of refraction in said second layer and said fourth layer are each $SiO_2$.

9. The material as claimed in claim 8, wherein said first layer is disposed on a substrate.

10. The material as claimed in claim 3, wherein said substrate is glass.

11. The material as claimed in claim 9, wherein said substrate is glass.

12. The material as claimed in claim 3, wherein said substrate is a synthetic material.

13. The material as claimed in claim 9, wherein said substrate is a synthetic material.

14. The material as claimed in claim 8, wherein said fifth layer is in contact with air.

15. The material as claimed in claim 8, wherein said first layer is $TiO_2$ and has a thickness of 468 nm.

16. The material as claimed in claim 8, wherein said third layer is $TiO_2$ and has a thickness of 468 nm.

17. The material as claimed in claim 8, wherein said fifth layer is $TiO_2$ and has a thickness of 483 nm.

18. The material as claimed in claim 1, wherein said second layer comprises $SiO_2$.

19. The material as claimed in claim 1, wherein said third layer is a solid layer.

20. The material as claimed in claim 6, wherein said second layer consists only of $SiO_2$.

21. The material as claimed in claim 1, wherein said second layer is a solid layer.

22. The material as claimed in claim 18, wherein said $SiO_2$ is solid.

23. The material as claimed in claim 1, wherein none of the first, second or third layers is a sol gel layer.

24. The material as claimed in claim 1, wherein the first, second and third layers comprise a solid material.

* * * * *